No. 781,013. PATENTED JAN. 31, 1905.
E. NOLLE.
CHAIN.
APPLICATION FILED DEC. 21, 1903.
Fig. 1.
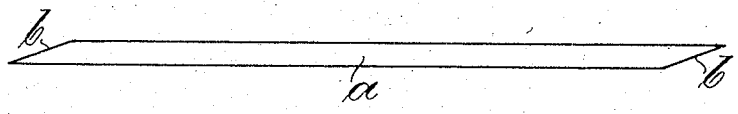
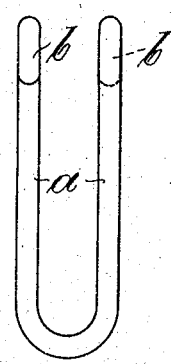 Fig. 2. 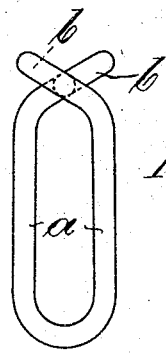 Fig. 3.
Fig. 4. Fig. 5. Fig. 6.
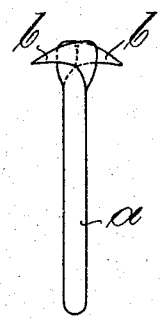  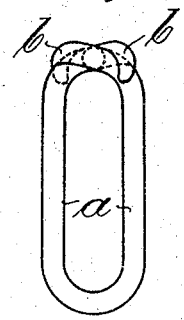
Witnesses:
Carl Ruys.
Paul Wollenberg.
Inventor
Ernst Nolle.
by Rosenkipler
Attorney.

No. 781,013.                                                                 Patented January 31, 1905.

UNITED STATES PATENT OFFICE.

ERNST NOLLE, OF WEISSENFELS, GERMANY.

CHAIN.

SPECIFICATION forming part of Letters Patent No. 781,013, dated January 31, 1905.

Application filed December 21, 1903. Serial No. 186,079.

*To all whom it may concern:*

Be it known that I, ERNST NOLLE, a subject of the King of Prussia, Emperor of Germany, and a resident of Weissenfels-on-the-Saale, Kingdom of Prussia, Germany, have invented certain new and useful Improvements in Chains, of which the following is an exact specification.

My invention relates to improvements in chains, and more especially to the construction of chain-links.

The purpose of the invention consists in providing a chain-link which is manufactured by bending a wire, in the manufacture of which no welding or soldering is necessary.

The chain-links hitherto manufactured without welding or soldering had mostly the great disadvantage that they required considerably more material than the welded links and that the form of the joint rendered it impossible to use the chain for all the purposes for which welded chains can be used. Before all, there is not a single chain-link manufactured without soldering or welding hitherto known in which the interior of the link has no projecting parts and has about the same form as is the case in welded links. All the projecting parts in the interior of the link cause great disadvantages, as they diminish mostly the flexibility of the chain and, furthermore, render the chains unfit for power transmission by means of chain-wheels. In order to avoid these disadvantages, I provide my present invention, which consists in a chain-link manufactured without soldering or welding and the form of which corresponds nearly perfectly to the form of a welded link. The joint of the ends of the wire from which the link is manufactured insures great stability, and the quantity of material to be used in the manufacture of the links does only immaterially surpass the quantity to be used in the manufacture of welded or soldered links.

I attain the purpose of my invention by the construction illustrated in the accompanying drawings, in which—

Figure 1 shows a piece of wire cut in a suitable manner for the manufacture of the links. Figs. 2 to 4 illustrate the operation of bending the wire; and Figs. 5 and 6 are views of the ready link forming the object of the present invention.

In the drawings, $a$ is a wire, the ends $b\ b$ of which are bevel-faced in that manner that the faces run parallel to each other.

In order to manufacture the link, the wire $a$ is bent at first in a U form, as shown in Fig. 2, the bevel-faces $b$ being situated one at the front side, the other one at the back side. Hereafter the bevel-faced ends are bent inward, as shown in Fig. 3, and are laid each around the round part adjacent to the bevel-faced end of the other end. Fig. 4 shows the ends $b\ b$ during this bending operation. After the ends being perfectly bent over the wire, as shown in Fig. 5, the joints are exposed to a high pressure, thereby effecting greater stability of the same.

Having thus fully described the nature of my invention, what I desire to secure by Letters Patent of the United States is—

A chain-link comprising a single piece of wire having its ends beveled parallel, said wire being bent to form a U, the beveled ends thereof being bent across each other, and each of said ends being bent over and around the outside of the opposite end, the flat faces of each of said beveled ends hugging the outside of its opposite end thereby forming a smooth and regular inner surface for the link, substantially as described.

In testimony whereof I have signed my name to this specification in the presence of two subscribing witnesses.

ERNST NOLLE.

Witnesses:
  RUDOLPH FRICKE,
  P. V. C. DUNN.